Jan. 1, 1963
A. M. HORVATH
3,071,064
TIMER ASSEMBLY
Filed Feb. 7, 1961
2 Sheets-Sheet 1
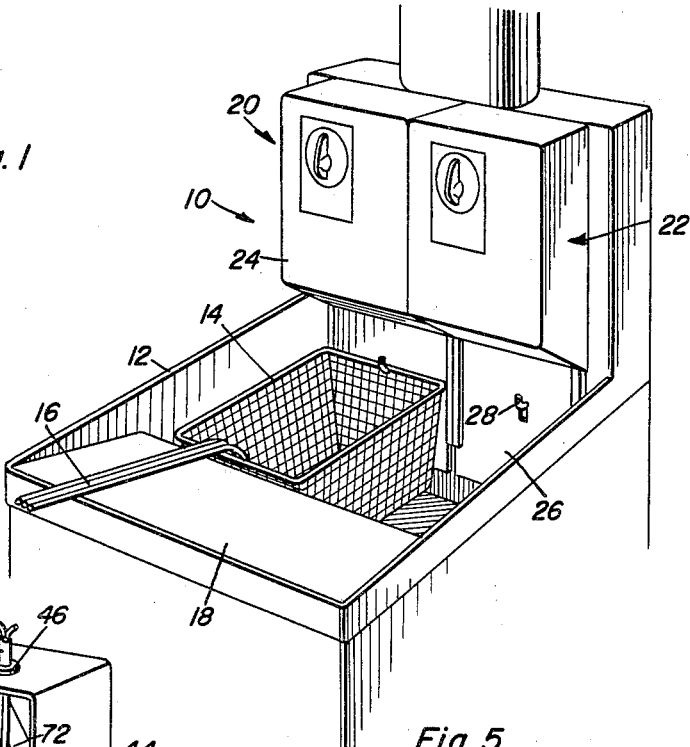
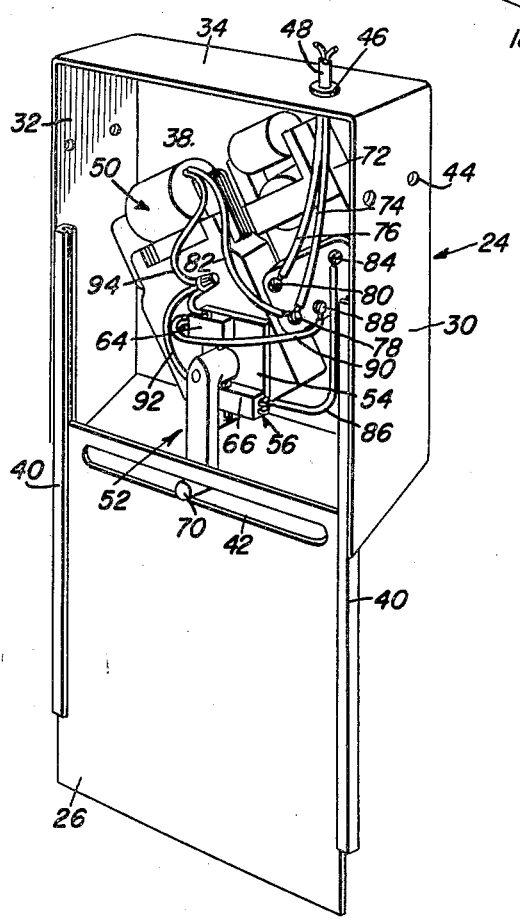
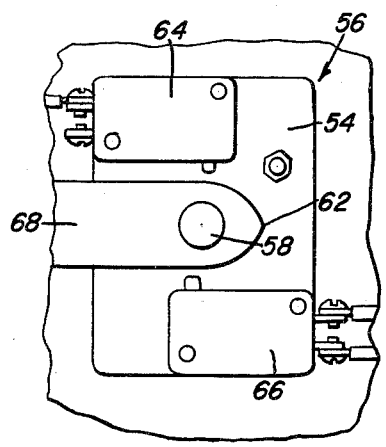
Alexander M. Horvath
INVENTOR.

Jan. 1, 1963 A. M. HORVATH 3,071,064
TIMER ASSEMBLY
Filed Feb. 7, 1961 2 Sheets-Sheet 2
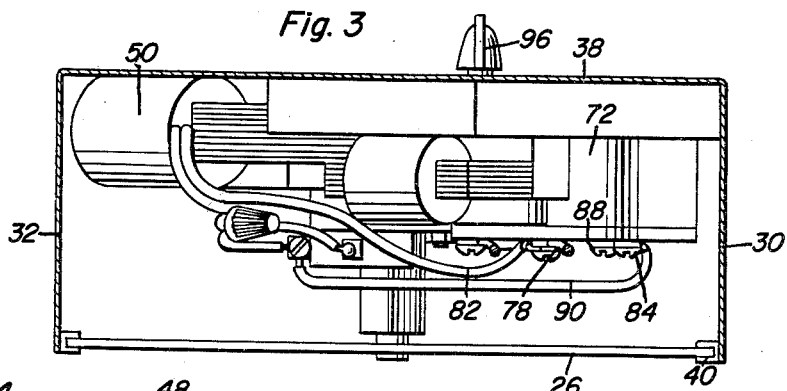
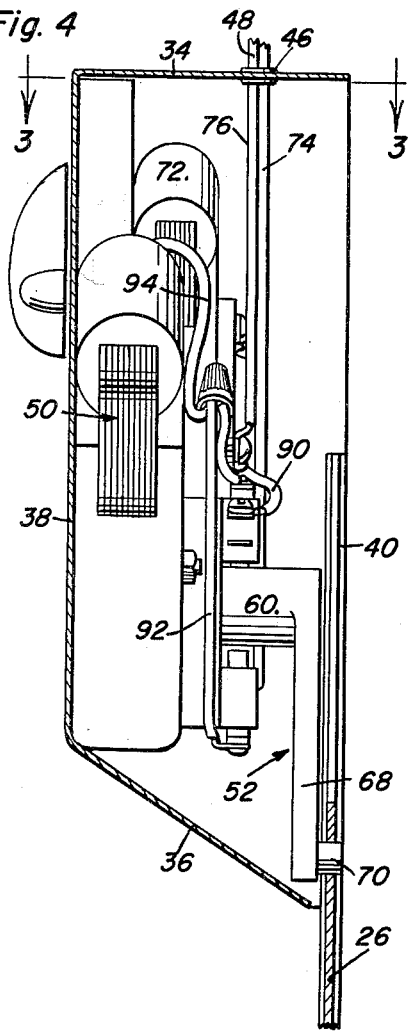
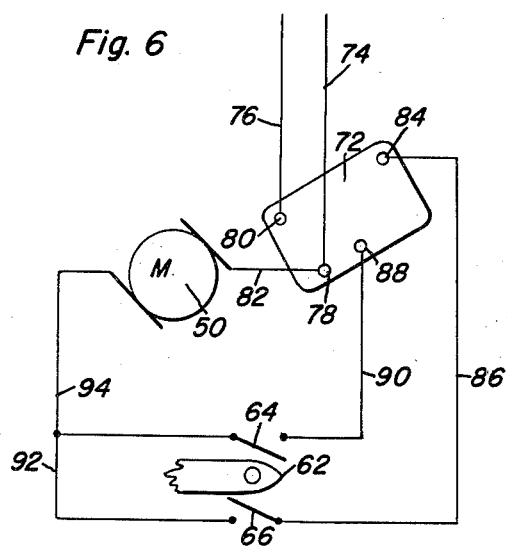
Alexander M. Horvath
INVENTOR.

United States Patent Office 3,071,064
Patented Jan. 1, 1963

3,071,064
TIMER ASSEMBLY
Alexander M. Horvath, 3059 Pearl Ave., Lorain, Ohio
Filed Feb. 7, 1961, Ser. No. 87,586
1 Claim. (Cl. 99—336)

This invention relates to a French fryer apparatus rendered automatic by combination with a novel timer assembly arrangement.

The present invention is particularly concerned with cooking apparatus and especially French fryers which include a deep cooking tank within which fat or grease is heated and into which a foraminous basket is lowered for the purpose of frying within the heated grease, potatoes or other contents within the foraminous basket after which the basket is raised thereby draining the fried items of the grease. The novel arrangement of the aforementioned cooking apparatus and the timer assembly enables one to set any desired cooking interval of time by a control knob on the timer assembly which is then operative to slowly lower the foraminous basket into the cooking tank and retain it in its lowered position for a predetermined interval of time after which the basket is raised for draining the fried items when fried for the selected interval of time. It is therefore a primary object of the present invention to provide an automatic French fryer capable of performing as hereinbefore indicated.

Another object of this invention is to provide a timer assembly especially designed for French fryers which may be easily installed and is effectively and simply operative to perform its functions in a foolproof manner.

A further object of this invention is to provide a timer assembly for French fryers which is enclosed within a housing mounted at one end of the cooking tank of the French fryer and disposed thereabove. A slide member is disposed rearwardly of the timer assembly housing and is movable between an upper and lower position within tracks which extend below the timer housing into the cooking tank. A slow speed electric motor is therefore mounted within the timer housing and drives a crank member slidably connected to an upper portion of the slide member for successively raising and lowering the slide member in response to unidirectional rotation of the motor shaft. A pair of microswitches are accordingly mounted on the motor for cooperation with a cam projection on the motor shaft so that the microswitches are engaged when the motor has positioned the slide member in either its upper or lower position. A timing mechanism is therefore electrically connected to a power source, to the motor and to the microswitches so that the motor may function by being pulsed for rotation from a position corresponding to the upper position of the slide member to the lower position at which time the slide member is held in the lower position for the predetermined interval set by the timing mechanism and after which the motor is again pulsed to raise the slide member to its upper position after which it is de-energized.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of an automatic French fryer accommodating a pair of frying baskets and timer assemblies.

FIGURE 2 is a perspective rear view of a single timer assembly with the slide member thereof in its lowered position.

FIGURE 3 is a top sectional view through a timer assembly taken through a line indicated by section line 3—3 in FIGURE 4.

FIGURE 4 is a longitudinal sectional view taken through a timer assembly.

FIGURE 5 is a partial elevational view of the microswitch assembly mounted within a timer assembly.

FIGURE 6 is an electrical circuit diagram of the timer assembly.

Referring now to the drawings in detail, attention is first invited toward FIGURE 1 which illustrates an automatic French fryer generally referred to by reference numeral 10 which is made in accordance with the principles of this invention. It will be observed that the French fryer includes a cooking tank 12 having sufficient depth for receiving there within cooking grease or fat to be heated by a suitable heating mechanism disposed below the cooking tank 12 so that a foraminous basket 14 may be lowered into and raised above the level of the cooking grease. Accordingly, as is well known in the art, the contents of the foraminous basket which may be cut up potatoes may be lowered into the cooking grease and fried there within for a predetermined time after which the basket may be raised and the grease thereby drained from the fried potatoes so that they may be served for consumption in a more desirable condition. A handle 16 is accordingly connected to one end of the basket 14 and rests upon a downwardly inclining ledge 18 formed at the forward end of the cooking tank 12. Mounted at the rear end of the cooking tank 12 are a pair of timer assemblies 20 and 22. It will be understood of course, that the number of timer assemblies and hence baskets 14 associated therewith for reception within the cooking tank 12 may vary. It will however be observed that the timer assembly 20 or 22 includes a control housing 24 which is disposed above the top of the cooking tank 12 and projects forwardly. Extending below the timer assembly however, within the tank 12 are slide members 26 to which a hanger element 28 is connected for suspending therefrom the basket 14. By controlled movement of the slide member 26 by the timer assembly with which it is associated, a basket 14 suspended thereon may be lowered and raised in timed sequence for frying and draining potatoes for example.

Referring now to FIGURES 2, 3 and 4, it will be observed that the housing 24 for the timer assembly includes side walls 30 and 32, a top wall 34, a downwardly sloping bottom wall 36 and a front wall 38. The rear of the timer housing 24 is open and has a pair of inwardly facing channel track members 40 tack welded to the sides 30 and 32 of the housing 24, the channel track members projecting there below into the cooking tank 12 when mounted thereon as indicated in FIGURE 1. The slide member 26 is slidably received between the channel track members 40 and includes adjacent the upper end thereof a horizontal slot 42 for purposes as will hereafter be explained. Mounting holes 44 are mounted on the side of the housing walls 30 and 32 for mounting the timer assemblies on certain French fryer installations. Also disposed in the top wall 34 of the timer assembly is a grommetted aperture 46 through which an electrical conduit 48 may be inserted for operative connection to the components located within the timer housing 24.

Mounted within the timer housing 24 is a low speed electric motor 50 having an output shaft disposed adjacent the lower end of the housing to which a crank mechanism 52 is connected. Mounted on the motor 50 is a mounting plate member 54 for a pair of microswitches of a switch assembly generally referred to by reference numeral 56. As will be seen more clearly in FIGURE 5, the motor shaft 58 is connected to the crank mechanism 52 which includes a sleeve portion 60 having a cam projection 62 thereon which is engageable with the plunger elements of microswitches 64 and 66 mounted above and below the motor shaft on the mounting plate 54. When the motor shaft and crank mechanism 52 are in one dead end position corresponding to the lower position of the slide member 26, as indicated in FIGURE 2, the cam projection 62 engages the switch plunger of the microswitch 64. When the slide member 26 is in its upper dead end position, the cam projection 62 engages the switch plunger of the microswitch 66. The crank mechanism 52 accordingly includes an arm 68 connected to the sleeve portion 60, which arm 68 has a pin 70 connected to the outer end thereof and projecting rearwardly therefrom for reception within the horizontal slot 42 of the slide member 26. Accordingly, rotation of the crank mechanism 52 will cause the slide member 26 to reciprocate between its upper and lower dead end positions. The crank mechanism 52 driven by the motor 50 is however driven at a slow rate of speed and the motor controllably energized and de-energized for the purpose of displacing the slide member 26 to its upper and lower positions. Operation of the motor as indicated is therefore controlled by an interval timer.

The interval timer which is generally referred to by reference numeral 72 is of any suitable type which when set for a predetermined time interval will energize a load connected thereto until some switch mechanism associated therewith disconnects the load after which reconnection of the load initiates the timing operation of the timer so that after the elapse of a predetermined time interval the load may be connected to the power source through the timer for completing the cycle. The power conduit 48 which may be connected to any suitable electrical power source includes a pair of power conductors 74 and 76 which are connected to terminals 78 and 80 respectively of the timer 72. Terminal 78 of the timer is connected by the conductor 82 to the motor 50. Terminal 84 of the timer is connected by conductor 86 to one terminal of the microswitch 66 while the terminal 88 of the timer is connected by conductor 90 to one terminal of the microswitch 64. A conductor 92 interconnects both of the other terminals of the microswitches 64 and 66 to the motor 50 by means of the conductor 94. A control knob 96 is connected to the timer 72 and projects from the front wall 38 of the timer assembly housing so that the timer may be manually set by the user.

Referring now to FIGURE 6 in particular, it will be observed that when the automatic French fryer is in its loading position, the microswitch 66 will be closed by means of the cam projection 62 since the slide member 26 is in its upper position. Accordingly, when the timer is set for a predetermined interval by selective positioning of the control knob 96, an operative connection is made between the terminals 80 and 84 so that current may flow through power conductor 74 to the motor 50 through conductor 82 and return by conductor 94, 92, and 86 with the switch 66 being closed to the timer 72 at terminal 84 which is then connected to the return line 76. The motor 50 will then be pulsed sufficiently to lower the slide member 26 to its lower position by kinetic energy. The microswitch 66 will then be opened to interrupt the flow of current and initiate operation of the timer mechanism 72. Upon reaching the lowered position, the microswitch 64 will be closed by the cam projection 62 to thereby complete a return line from the motor 50 through conductors 94 and 90 which is connected to the terminal 88 of the timer. Accordingly, after a predetermined interval of time the timer will make an operative connection between the terminals 80 and 88 to complete the return portion of the circuit whereupon the motor 50 will continue to rotate to thereby pulse the motor 50 for raising the slide member 26 to its upper position. Upon movement of the cam projection 62 from the lower position thereof, the microswitch 66 will be opened to interrupt the circuit which will then be reconditioned for a new cycle when the cam projection 62 again closes the microswitch 64 when it reaches the upper position thereof. It will therefore be apparent, that once the timer has been set and the basket lowered to its lower position for frying, manual raising of the basket and the slide will not interrupt the timing cycle. Operation and utility of the present invention will therefore be apparent from the foregoing description of both the structural arrangement and the functional operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In combination with a French fryer having a cooking tank into which a foraminous basket may be lowered for frying its contents within the tank, a self-contained timer assembly mounted on one end of the cooking tank comprising, control housing means disposed above the tank, track means mounted rearwardly on the housing means and extending therebelow into the tank, slide means comprising a plate member slidably received within the track means, hanger means mounted on the slide means and projecting forwardly therefrom for suspending the foraminous basket therefrom, rotary motor means having a shaft mounted within the housing means, crank means driven by the motor means and slidably connected to the slide means for movement thereof between an upper and lower position, switch means mounted on the motor means, and selective interval timing means operatively connected to the motor means and switch means and mounted in the housing means, said crank means including a sleeve portion mounted on said motor shaft and a cam projection thereon for engaging the switch means, an arm connected to the sleeve portion and a rearwardly projecting pin on said arm received within a horizontal slot adjacent the upper end of the plate member for slidable connection to the slide means, said switch means comprising a first and second normally opened switch disposed on opposite sides of said sleeve portion for alternate engagement by the cam projection, said first switch being electrically connected by a first electrical circuit to said timing means and said motor means, said second switch being electrically connected by a second electrical circuit to said timing means and said motor means, said timing means alternately electrically connecting said first and said second electrical circuit to a source of electrical power; said first switch being closed by said cam projection only when said slide means is in the upper position whereby upon connection of said first electrical circuit to said source of electrical power by said timing means, said motor means is activated and pulsed to move said side means to said lower portion; said second switch being closed by said cam projection only when said slide means is in said lower position whereby upon connection of said second electrical circuit to said source of electrical power by said timing means, said motor means is activated and pulsed to move said slide means to said upper position.

References Cited in the file of this patent

UNITED STATES PATENTS

| | | |
|---|---|---|
| 2,622,445 | Benedict | Dec. 23, 1952 |
| 2,766,680 | Tagliaferri | Oct. 16, 1956 |
| 2,786,105 | Pawley et al. | Mar. 19, 1957 |